United States Patent

Peterson

[15] 3,688,334
[45] Sept. 5, 1972

[54] WINDSHIELD WIPER BLADE HAVING HORIZONTAL PATH

[72] Inventor: Donald W. Peterson, Fenton, Mich.

[73] Assignee: General Motors Corporation, Detroit, Mich.

[22] Filed: Dec. 16, 1970

[21] Appl. No.: 98,621

[52] U.S. Cl. ..........15/250.21, 15/250.23, 15/250.30
[51] Int. Cl. ...............................................B60g 1/02
[58] Field of Search.........15/250.13, 250.16, 250.17, 15/250.19, 250.21, 250.23, 250.3

[56] References Cited

UNITED STATES PATENTS 3,590,415  7/1971  Mori......................15/250.23

FOREIGN PATENTS OR APPLICATIONS 385,408  12/1932  Great Britain..........15/250.19

Primary Examiner—Peter Feldman
Attorney—W. E. Finken and W. A. Schuetz

[57] ABSTRACT

In a preferred form, this disclosure relates to a windshield wiper apparatus which is operable to reciprocate a windshield wiper in a generally horizontal path across the windshield while maintaining the wiper in a generally vertical disposition during running operation and which is operable to park the same in a generally horizontal position adjacent the lower edge of the windshield when wiper operation is being terminated. The windshield wiping apparatus includes a stationary support means, a lever means pivotally supported at one end by the support means and which is adapted to be swung to and fro for reciprocably moving a wiper pivotally connected to its other end through first and second strokes across the windshield, a first drive means operatively connected with the wiper for simultaneously rotating the wiper relative to the lever means to increase the stroke length in response to swinging movement being imparted to the lever means, a second drive means for moving an articulating means relative to the lever means to maintain the wiper blade assembly in a generally vertical disposition as it moves through its strokes, and a parking mechanism which is operable to permit the wiper and articulating means to move relative to the lever means as the latter is swung to and fro during running operation and which is operable to prevent relative movement therebetween when the wiper is midway through one of its strokes when running operation is being terminated to effect movement of the wiper from a generally vertical disposition to a generally horizontal park position adjacent the lower edge of the windshield.

3 Claims, 7 Drawing Figures

INVENTOR.
Donald W. Peterson
BY
W. A. Schuetz
ATTORNEY

INVENTOR.
Donald W. Peterson
BY
W. A. Schuetz
ATTORNEY

WINDSHIELD WIPER BLADE HAVING HORIZONTAL PATH

The present invention relates to a windshield wiping apparatus, and in particular to a windshield wiping apparatus which is operable to reciprocate a windshield wiper in a generally horizontal path across the windshield while maintaining the wiper in a generally vertical disposition during running operation and which is operable to park the same in a generally horizontal position adjacent the lower edge of the windshield when wiper operation is being terminated.

An object of the present invention is to provide a new and improved windshield wiping apparatus for wiping a windshield of an automotive vehicle and which includes a stationary support means, a lever means pivotally supported at one end by the support means and which is adapted to be swung to and fro for reciprocably moving a windshield wiper pivotally connected to its other end through first and second strokes in a generally horizontal path across the windshield, a drive means operatively connected with the wiper for simultaneously rotating the wiper relative to the lever means to increase the stroke length of the path traversed by the wiper in response to swinging movement being imparted to the lever means, and a parking mechanism which is operable in response to wiper operation being terminated for parking the wiper in a generally horizontal position adjacent the lower edge of the windshield.

A further object of the present invention is to provide a new and improved windshield wiping apparatus, as defined in the next preceding object, and in which the parking mechanism is operable to permit the wiper to rotate relative to the lever means as the latter is swung to and fro to reciprocably move the wiper during running operation and which is operable when wiper operation is being terminated to prevent relative rotation therebetween when the wiper reaches a predetermined position during one of its strokes to cause the wiper and lever means to move in unison during the latter portion of its stroke to park the wiper in a generally horizontal position adjacent the lower edge of the windshield.

Another object of the present invention is to provide a new and improved windshield wiping apparatus for wiping a windshield of an automotive vehicle and which includes a stationary support means for supporting a first shaft; a lever means pivotally connected to the first shaft at one end and which carries a second pivot shaft at its other end; a windshield wiper having a wiper arm drivingly connected to the second pivot shaft, a wiper blade assembly pivotally connected to the wiper arm for movement about an axis extending generally normal to the windshield, and an articulating arm means pivotally connected to the second pivot shaft and the wiper blade assembly; a primary drive means operatively connected with the lever means for swinging the same to and fro about the first shaft through an arc of approximately 180° to reciprocably move the wiper through first and second strokes in a generally horizontal path during running operation; a first planetary drive means operatively connected with the first and second shafts for rotating the windshield wiper arm relative to the lever means in response to movement being imparted to the lever means by the primary drive means to increase the stroke length of the windshield wiper, and a second planetary drive means operatively connected with the first shaft and the articulating arm means for effecting movement of the latter relative to the lever means to maintain the wiper blade assembly in a generally vertical disposition as it is moved through its strokes in response to swinging movement being imparted to the lever means.

Yet another object of the present invention is to provide a new and improved windshield wiping apparatus, as defined in the next preceding object, and which includes a parking mechanism which is operable to permit the wiper and articulating arm means to rotate relative to the lever means as the latter is swung to and fro to reciprocate the wiper through its strokes during running operation and which is operable when wiper operation is being terminated to prevent relative rotation therebetween as the wiper reaches its midposition during one of its strokes to cause the wiper and lever means to move in unison during the latter portion of its stroke whereby the wiper is caused to be moved from a generally vertical position toward a horizontal park position adjacent the lower edge of the windshield.

A still further object of the present invention is to provide a new and improved windshield wiping apparatus, as defined in the next preceding object, and in which the parking mechanism has parking arm fixed to said first shaft and a movable detent means which is movable between a first position in which it locks said parking arm to said stationary means to enable the lever means to be swung to and fro relative thereto and a second position in which it locks said parking arm to said lever means to cause said first and second planetary drive means to be rotated as the lever means is swung to and fro to prevent relative rotation between the wiper arm and articulating means and the lever means to cause the wiper to be moved towards its park position.

The present invention further resides in various novel constructions and arrangement of parts, and further objects, novel characteristics and advantages of the present invention will be apparent to those skilled in the art to which it relates and from the following detailed description of the illustrated embodiment thereof made with reference to the accompanying drawings forming a part of this specification and in which similar reference numerals or characters are employed to designate corresponding parts throughout the several views, and in which.

Figure 1:
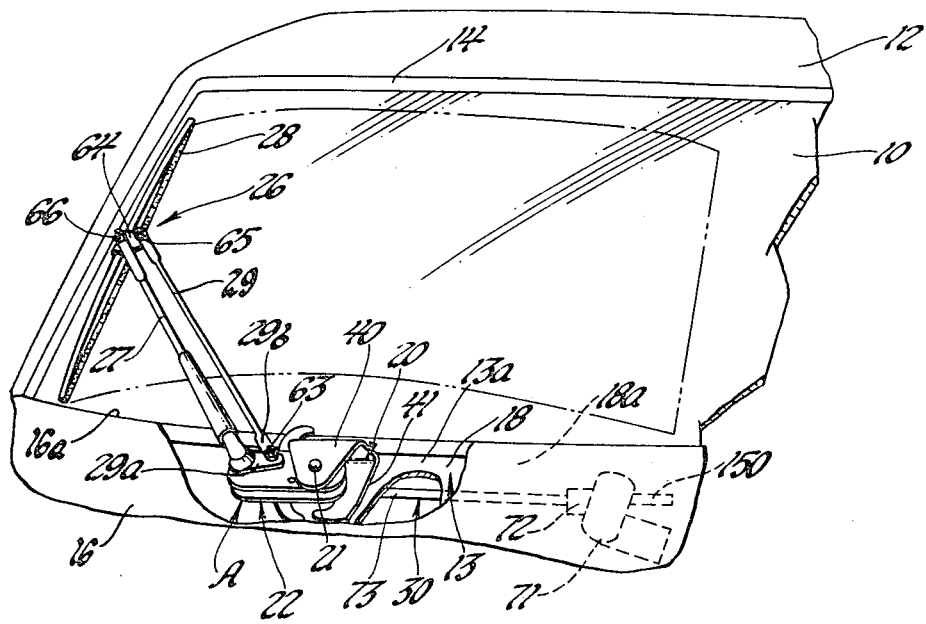
FIG. 1 is a fragmentary front elevational view of a vehicle embodying the novel windshield wiping apparatus of the present invention.

The present invention provides a novel windshield wiping apparatus which is operable to reciprocate a windshield wiper in a generally horizontal path across the outer surface of a windshield while maintaining the wiper in a generally vertical disposition during running operation, and which is operable to park the same in a generally horizontal position adjacent the lower edge of the windshield when running operation is being terminated.

As representing a preferred embodiment of the present invention, the drawings show a windshield wiping apparatus A for wiping a windshield 10 of an automotive vehicle 12. The windshield 10 is suitably supported by the vehicle body structure 13 and is completely surrounded by reveal molding 14. The vehicle 12 also includes a forwardly extending hood 16 whose rearward edge 16a is spaced forwardly of the windshield 10. The windshield 10, hood 16 and body structure 13 defines a well or compartment 18 for housing the major portion of the windshield wiping apparatus A. The well or compartment 18 at its upper end defines an open slot 18a extending transversely across the vehicle 12.

The windshield wiping apparatus A broadly comprises a stationary support means 20; a first or support shaft 21 carried by the stationary support means 20; a swingable lever means 22 which is pivotally connected at one end to the support shaft 21 and which carries a second or pivot shaft 24 at its other end; a windshield wiper 26 having a wiper arm 27 which is drivingly connected to the pivot shaft 24, a wiper blade assembly 28 which is pivotally connected to the wiper arm 27 for movement relative thereto about an axis extending generally normal to the windshield 10 and an articulating arm means 29 rotatably connected with the pivot shaft 24 for controlling the attitude of the wiper blade assembly 28; a primary drive transmission or means 30 pivotally connected with the lever means 22 adjacent its lower end for swinging the lever means 22 to and fro through an arc of approximately 180° to cause the wiper 26 to be reciprocably moved through first and second strokes in a generally horizontal path across the outer surface of the windshield 10; a first planetary drive means 32 operatively connected with the shafts 21 and 24 for rotating the wiper arm 27 of the wiper 26 relative to the lever means 22 through an arc of approximately 90° in response to swinging movement being imparted to the lever means 22 by the drive transmission 30 to increase the length of the stroke of the wiper 26; a second planetary drive means 34 operatively connected with the shaft 21 and the articulating arm means 29 for moving the latter to maintain the wiper blade assembly 28 in a generally vertical disposition in response to the lever means 22 being swung to and fro; and a parking mechanism 36 which is operable to permit the wiper arm 27 and articulating arm means 29 to be moved relative to the lever means 22 during running operation and which is operable when wiper operation is being terminated to prevent the same from moving relative to the lever means 22 when the wiper 26 is at the midportion of one of its strokes to cause the wiper 26 and the lever means 22 to be moved in unison during the remaining portion of the stroke to a generally horizontal park position adjacent the lower edge of the windshield 10.

The stationary support means 20 comprises a fabricated generally U-shaped member having spaced legs 40 and 41 integrally connected by a transverse or bight portion 42. The leg 41 is suitably bolted or otherwise secured to a frame 13a of the vehicle support structure 13. The legs 40 and 41 have aligned openings 40a and 41a and support a pair of bushings 44 and 45 which are respectively press fitted within the openings 40a and 41a. The bushings 44 and 45 rotatably support the annular support or first shaft 21.

The shaft 21 rotatably supports the lever means 22 for rotational movement about its axis 21a. The lever means 22 comprises a U-shaped member having a pair of legs 50 and 51. The shaft 21 carries a pair of spaced bushings 52 and 53 which are press fitted in openings 50a and 51a in the legs 50 and 51 at the upper end of the lever means 22. The bushings 52 and 53 rotatably support the lever means 22 for pivotal movement in opposite directions about the axis 21a of the shaft 21.

The lever means 22 supports the windshield wiper 26. To this end, the lever means 22, at its lower end, carried a pair of spaced bushings 55 and 56 which are press fitted within openings 50b and 51b in the legs 50 and 51 of the lever means 22. The bushing 55 has a central opening which slidably receives a sleeve or sleeve means 60. The sleeve 60 and the bushing 56 have aligned central openings which slidably receives the second shaft 24, the shaft 24 being rotatably supported by the sleeve 60 and the bushings 56.

The windshield wiper 26 is connected to the shaft 24 carried by the lever means 22. The shaft 24 has a knurled end 24a which is drivingly connected to the wiper arm 27 in a manner well known to those skilled in the art. The shaft 24 also rotatably supports the articulating arm means 29. To this end, the articulating arm means 29 comprises a first arm 29a which is drivingly connected to the sleeve 60 via a set screw 62 and a second arm 29b pivotally connected to the other end of the first arm 29a by a pivot pin means 63 and its other end pivotally connected to a lever 64 by a pivot pin means 65. The lever 64 in turn has its other end pivotally connected to the upper end of the wiper arm 27 and to the wiper blade assembly 28 by a pivot pin means 66.

Figure 2:
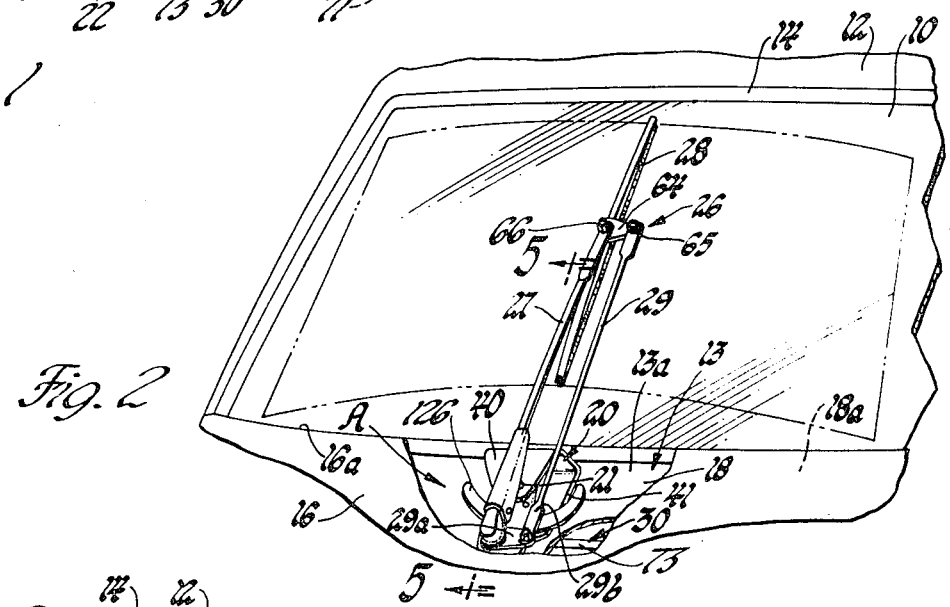
FIGS. 2–4 are views similar to that shown in FIG. 1, but showing different parts thereof in different positions.
Figure 3:
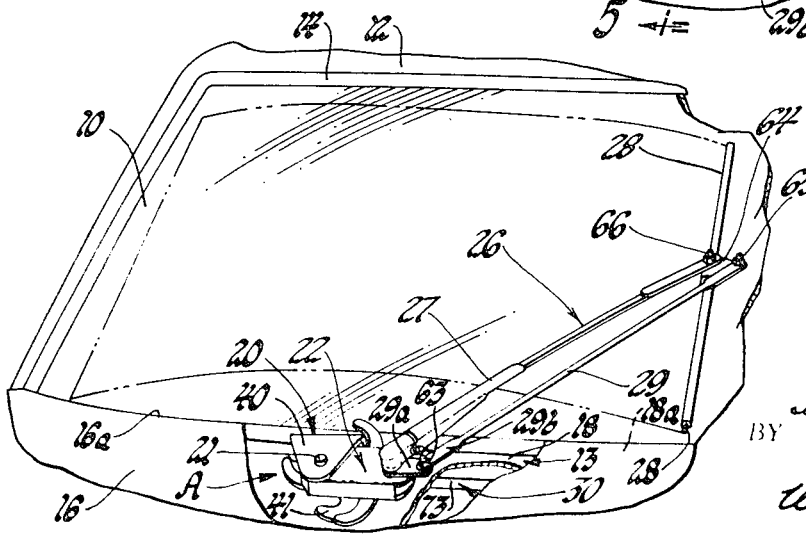

The lever means 22 is adapted to be swung to and fro about the axis 21a of the shaft 21 to cause the windshield wiper 26 to be reciprocated through leftward and rightward strokes in a generally horizontal path across the outer surface of the windshield 10. The lever means 22 is adapted to be swung about the axis 21a of the shaft 21 through an arc of substantially 180° between a leftmost position, as shown in FIG. 1, and a rightmost position, as shown in FIG. 3. When the lever means 22 is in its leftmost position it is generally horizontally disposed and the windshield wiper 26 is in its leftmost stroke end position and when the lever means 22 is in its rightmost position it is generally horizontally disposed with respect to the lower edge of the windshield and the wiper 26 is in its rightmost stroke end position. As the lever means 22 is swung from its leftmost position towards its rightmost position, the windshield wiper 26 is simultaneously moved horizontally across the windshield 10 and vertically downward with respect to the windshield 10 until it is midway through its stroke, as shown in FIG. 2, and then the windshield wiper 26 is simultaneously moved horizontally and vertically upward. The resultant path of the windshield wiper 26 is such that it is generally moved horizontally across the windshield 10.

The lever means 22 is adapted to be swung to and fro by the primary drive transmission or means 30. The drive means 30 preferably comprises a uni-directional electric motor and gear reduction unit 71 whose output shaft is drivingly connected to one end of crank arm 72. The other end of the crank arm 72 is swivelly connected by a ball and socket joint to one end of a drive link 73. The other end of the drive link 73 is swivelly connected to the lever means adjacent the lower end of the latter by a ball and socket joint 74. When the drive means 30 is energized it causes the drive link 73 to be reciprocated back and forth which in turn causes the lever means 22 to be swung to and fro between its leftmost and rightmost end positions, as respectively shown in FIGS. 1 and 3.

The wiper means 26 is also rotated relative to the lever means 22 through an arc of substantially 90° in response to the lever means 22 being swung to and fro. This increases the length of the strokes of the wiper 26 and enables the wiper to wipe more of the windshield surface 10.

The wiper 26 is rotated relative to the lever means 22 by the first planetary drive means 32. The planetary drive means 32 comprises a toothed pulley or gear 75 which is drivingly connected to the shaft 21, a toothed pulley or gear 76 which is drivingly connected to the shaft 24 and an endless toothed belt 77 which is trained around the pulleys 75 and 76. The pulleys 75 and 76 are drivingly connected to the shafts 21 and 24 by slot and key connections 78 and 79, respectively. The pulley 75 has a larger diameter than the pulley 76.

During running operation of the wiper apparatus A, the shaft 21 is held stationary and, hence, the pulley 75 is held stationary. The swinging or reciprocable movement imparted to the lever 22 thus causes different portions of the belt 77 on opposite sides of the pulley 75 to wrap around and unwrap therefrom. This wrapping and unwrapping of the belt 77 with respect to the pulley 75 causes the pulley 76, which is of a lesser diameter than pulley 75, to be rotated, which in turn causes the drive shaft 24 and the wiper 26 to be rotated. It has been found that if the ratio of the diameters between the pulleys 75 and 76 is 1.9 to 1.0, that the shaft 24 and wiper 26 will be rotated substantially 90° in response to the lever being swung through an arc of substantially 180°.

The wiper blade assembly 28 as it is moved through its stroke is maintained in a vertical attitude with respect to the windshield 10 by the second planetary drive means 34. The second planetary drive means 34 comprises a toothed pulley or gear 80 which is fixed to the shaft 21, a toothed pulley or gear 81 which is fixed to the sleeve 60 and an endless toothed belt 82 trained around the pulleys 80 and 81. The pulley 80 is drivingly connected to the shaft 21 by the slot and key connection 78 and the pulley 81 is drivingly connected to the shaft 24 by a slot and key connection 85. The pulleys 80 and 81 are of the same diameter.

When the lever 22 is swung to and fro it causes different portions on opposite sides of the belt 82 to wrap and unwrap from the pulley 80, which in turn causes the pulley 81 to be rotated. Since the pulley 81 is of the same diameter as the pulley 80, the sleeve 60 and articulating arm 29a will be rotated substantially 180° relative to the lever means 22 as the latter is swung substantially 180°. Thus, the sleeve 60 and the articulating arm 29a are maintained in the same position during the entire arcuate swinging movement of the lever means 22. It can be seen from FIGS. 1 through 3 that the articulating arm 29a is maintained generally in the same horizontal position during the entire arcuate swinging movement of the lever means 22.

This maintenance of the articulating arm 29a in the same attitude with respect to the windshield 10 causes the articulating arm 29b as it is arcuately moved by the wiper arm 27, due to the rotational movement imparted thereto, to effect a turning movement of the lever 64 to maintain the wiper blade assembly 28 in a vertical disposition throughout its path of movement across the windshield 10. By maintaining the wiper blade assembly 28 in a substantially vertical attitude, it will be disposed parallel to the air stream flowing over the vehicle. This eliminates or substantially minimizes any problems regarding wind lift of the wiper blades.

Figure 4:
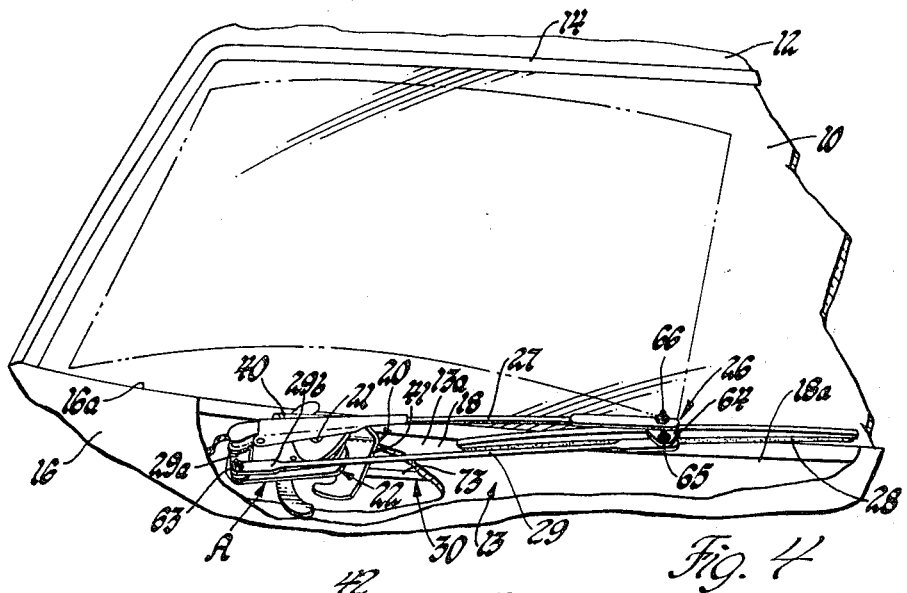

When running operation of the windshield wiper apparatus A is no longer desired, the windshield wiper 26 is caused to be moved to a generally horizontal parked position, as shown in FIG. 4, in which it is disposed adjacent the lower edge of the windshield 10 and in the slot 18a so as to be concealed from view. To this end, the novel parking mechanism 36 is provided. The parking mechanism 36 is broadly operable to lock the shaft 21 against relative rotation with respect to the stationary support means 20 and to allow the wiper 26 to be rotated relative to the lever means 22 during running operation and is operable to unlock the shaft from the stationary support means 20 and the shaft 21 to the lever means 22 to prevent the wiper 26 from rotating relative to the lever means 22 during parking operation.

Figure 5:
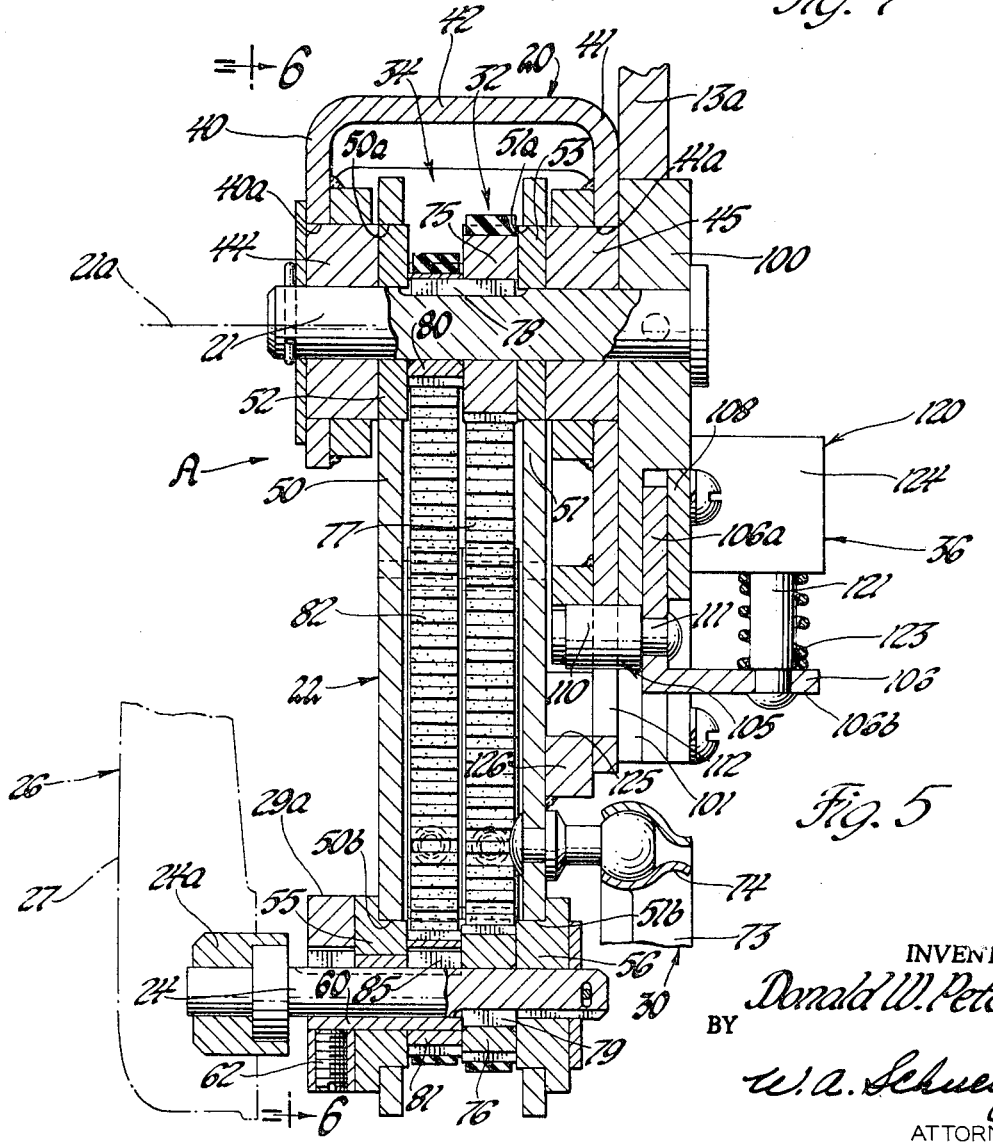
FIG. 5 is an enlarged cross-sectional view, with parts shown in elevation, taken approximately along lines 5—5 of FIG. 2.

The parking mechanism 36 comprises a parking arm 100 which is drivingly connected at its upper end to the shaft 21. The arm 100 at its bottom end is bifurcated to define a vertically extending slot or notch 101, as best shown in FIG. 5. The parking arm 100 is adapted to be selectively coupled and uncoupled to the stationary housing means 20 and the lever means 22 by a shiftable detent means 105. The shiftable detent means 105 comprises an L-shaped member 106 having one leg 106a thereof slidably supported by the arm 100 for movement in opposite directions relative thereto and toward and from the shaft 21. The leg 106a is slidably guided for movement toward and from the shaft 21 by a guide means 108 suitably secured to the arm 100.

The leg 106a carries a roller or detent 110 which is rotatably journaled on a pin 111 secured to the leg 106a adjacent its lower end. The roller 110 is disposed within the notch 101 of the arm 100 and is disposed within an aligned notch 112 in the leg 41 of the stationary support means 20 during running operation of the wiper 26.

Figure 6:
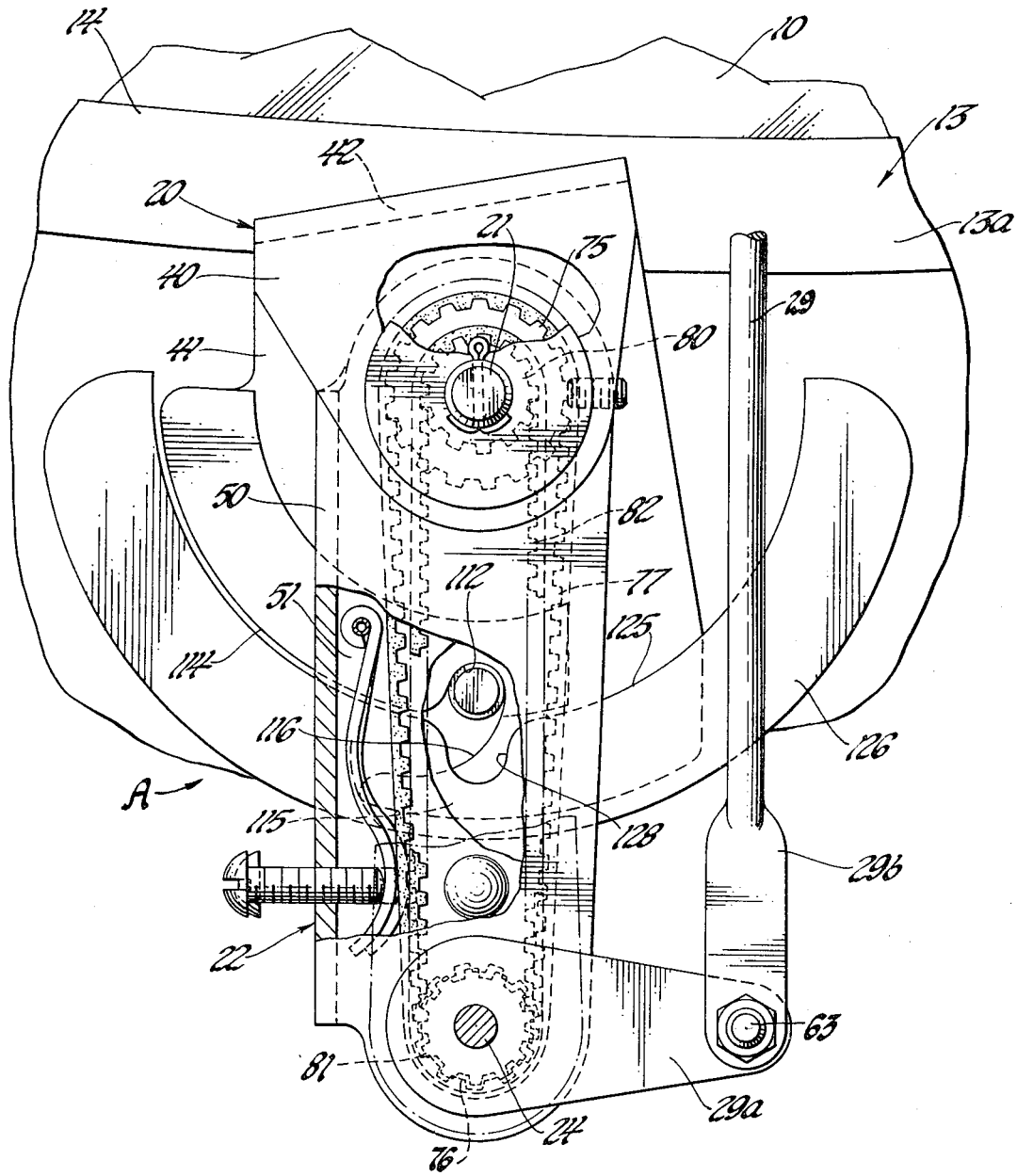
FIG. 6 is a side elevational view, with parts broken away or shown in section, looking in the direction of the arrow 6—6 of FIG. 5.
Figure 7:
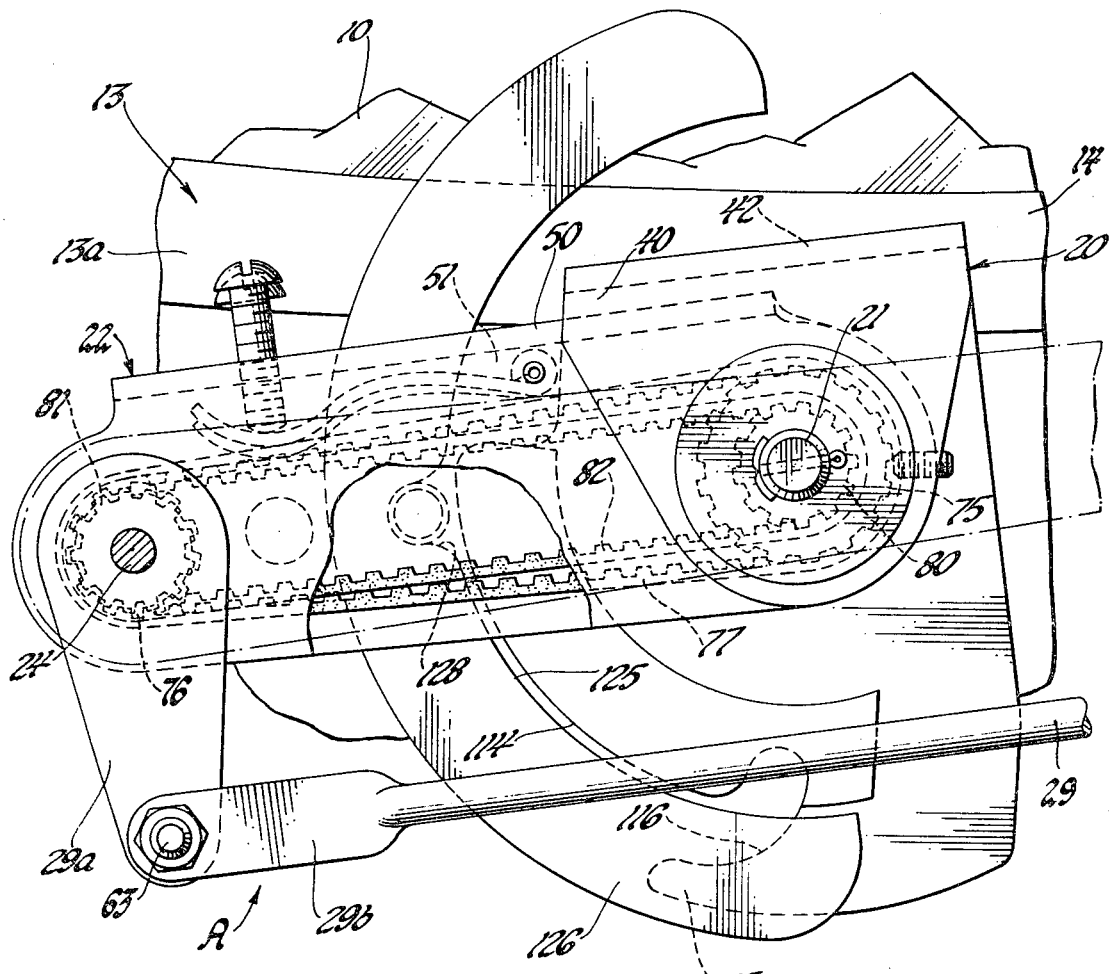
FIG. 7 is an enlarged side elevational view like that shown in FIG. 6, but showing different parts thereof in different positions.

As best shown in FIG. 6, the leg 41 of the support means 20 at its lower end defines an arcuately extending cam surface 114 which is concentric with the axis 21a of the drive shaft 21 and which terminates with the notch 112 which extends radially inwardly therefrom toward the axis 21a. The support means 20 also includes a downwardly extending foot portion 115 whose leftward end, as viewed in FIG. 6, defines a cam surface 116 which extends beneath the notch 112 and partially beneath the cam surface 114 at a spaced radial location.

During running operation of the wiper 26, the roller 110 is received within the notch 112 of the stationary support means 20. This locks the arm 100 and the shaft 21 to the stationary support means 20 to prevent relative rotation therebetween. The roller 100 is held within the notch during running operation of the wipers by a solenoid means 120. The solenoid means 120 is carried by the arm 100 and includes a suitable solenoid having a selectively energizable solenoid coil (not shown) having a movable core 121. The core 121 has its free end suitably secured to the other leg 106b of the L-shaped member 106. The solenoid 120 is energized during running operation of the wipers and when energized draws the core 121 upwardly to move the member 106 upwardly and the roller 110 within the notch 112 of the stationary support means 20.

The solenoid coil 120 is adapted to be in a series circuit with the vehicle battery and the electric motor 71 for driving the windshield wiper 26. Energization and de-energization of the wiper motor 71 is preferably controlled by suitable manually manipulatable control switch (not shown) which is accessible to the vehicle operator. When the control switch is moved to an on position to energize the wiper motor 71, the solenoid 120 is also energized to move and maintain the roller 110 within the notch 112 of the stationary support means 20. When the wiper motor is de-energized to terminate running operation of the wiper, this circuit for the motor 71 and solenoid 120 will be de-energized. The wiper motor 71, however, will remain energized until the wiper 26 reaches its park position due to a conventional parking switch (not shown) mounted within the wiper motor 71. As well known in the art, this parking switch will be located in a parallel circuit with the wiper motor and the solenoid 120 to maintain the wiper motor 71 energized until the wiper reaches its park position.

When the operator moves the control switch (not shown) for the wiper motor to its off position to terminate running operation, the solenoid 120 is de-energized. This causes a compression spring 123 having one end in abutting engagement with a solenoid housing 124 for containing the solenoid coil and its other end in abutting engagement with the leg 106b of the L-shaped member 106 to move the latter downwardly and into engagement with an arcuate cam surface 125 of an arcuate cam 126 on the lever means 22. The arcuately extending cam 126 is suitably welded to the leg 41 of the lever means 22 and the arcuately extending cam surface 125 is concentric with the axis 21a of the shaft 21. Intermediate the ends of the arcuate cam 126 is a notch 128.

When the windshield wiper 26 reaches its midway position on being moved through its rightward stroke upon wiper operation being terminated, the notch 128 in the cam 126 will be aligned with the notch 101 in the arm 100 and the spring 123 will move the roller 110 into the notch 128. If wiper operation were terminated prior to the time the wiper 26 being in its midway position during its rightward stroke, the roller 110 would merely have moved down into engagement with the cam surface 125 and roll thereon until the notch 128 became aligned with the notch 101. When the roller 110 is in the notch 128 the parking arm 100 is unlocked from the support means 20 and locked to the lever means 22 whereby further movement of the lever means 22 toward the left from its midway position shown in FIG. 2 towards its leftmost end position causes the lever means 22 and the parking arm 100 to move in unison. When the parking arm 100 is also rotated with the lever means 22 the pulleys 75 and 80 are rotated therewith which causes the belts 77 and 82 to be rotated and the pivot shaft 24 to be rotated along with the rotation now being imparted to the shaft 21. With both shafts 21 and 24 being rotated at the same angular speed, the relative positions of the wiper arm 27 and the articulating arm 29a with respect to the lever means 22 remains the same and hence, there is no relative movement therebetween. Thus, the wiper 26 will be rotated approximately 90° from its midway position, as shown in FIG. 2, towards its parked position, as shown in FIG. 4, in which the wiper 26 and the lever means 22 are in a substantially horizontal position within the slot 18 adjacent the lower edge of the windshield 10. When the wiper 26 has reached a parked position the park switch (not shown) within the wiper motor 71 will be opened to de-energize the motor 71.

When wiper operation is being initiated, the reverse movements of the parts will take place. That is, when wiper operation is initiated by moving the control switch (not shown) to an on position, both the wiper motor 71 and the solenoid 120 are energized, since they are in series circuit with each other. Energization of the solenoid 120 however cannot at this time cause the roller 110 to be moved upwardly out of the notch 128 since the roller 110 will engage the cam surface 114. During the swinging movement of the lever means 22 toward the right from its position shown in FIG. 4 toward its midway position shown in FIG. 2, the roller 110 will roll on the cam surface 114 until it is aligned with the notch 112 whereupon the energized solenoid 120 will move the L-shaped member 106 and roller 110 upwardly and with the roller 110 being received within the notch 112 of the stationary support means 20. The cam surface 116 guides the movement of the roller 110 upwardly into the notch 112. With the roller 110 within the notch 112, the lever means 22 is unlocked from the parking arm 100 and the parking arm 100 is locked to the stationary housing 20. This prevents the pulleys 75 and 80 from rotating and thus, effects rotational movement of the wiper 26 relative to the lever means 22 as the latter is swung to and fro during running operation in the manner hereinbefore described.

Although only the wiper and apparatus for wiping the left side of the windshield, as viewed in FIGS. 1–4 has been shown and described, it will, of course, be understood that an identical wiper and apparatus for the right side of the windshield and which would be driven by the crank arm 72 of the wiper motor 71 via a cross link 150 would be provided.

Although the illustrated preferred embodiment hereof has been described in great detail, it should be apparent that certain modifications, changes and adaptations may be made in the illustrated embodiment, and

What is claimed is:

1. A windshield wiping apparatus for wiping a windshield of an automotive vehicle comprising: a stationary support means which is adapted to be secured to the vehicle; a first shaft supported by said support means; a lever means having one end pivotally connected with said first shaft; a second shaft pivotally connected with the other end of said lever means; a windshield wiper comprising a wiper arm drivingly connected with said second shaft, a wiper blade assembly pivotally connected with said arm for movement about an axis extending generally normal to the windshield; articulating arm means pivotally connected with said second shaft and connected with said wiper blade assembly; a primary drive means operatively connected with said lever means adjacent its other end for swinging the same to and fro about said first shaft in an arcuate path beneath said first shaft to effect reciprocation of said wiper in a generally horizontal path across the windshield; a first planetary drive means operatively connected with said first and second shafts and operable to effect rotation of said wiper in response to said lever means being swung to and fro to increase the stroke length of the wiper; second planetary drive means operatively connected with said first shaft and said articulating arm means for actuating said articulating arm means to pivot said wiper blade assembly as the wiper arm is being rotated in response to swinging movement of said lever means to maintain the wiper blade assembly in a substantially vertical disposition as the wiper is being moved through its strokes, and a parking mechanism operable to effect rotation of said wiper to a generally horizontal position adjacent the lower edge of the windshield to park the same when wiper operation is being terminated.

2. A windshield wiping apparatus for wiping a windshield of an automotive vehicle comprising: a stationary support means adapted to be secured to the vehicle; a first shaft supported by said support means; a lever means having one end pivotally connected with said first shaft; a second shaft pivotally connected with the other end of said lever means; a windshield wiper comprising a wiper arm drivingly connected with said second shaft, a wiper blade assembly pivotally connected with said arm for movement about an axis extending generally normal to the windshield and an articulating arm means operatively connected with said wiper blade assembly and pivotally connected with said second shaft; a primary drive means operatively connected with said lever means adjacent its other end for swinging the same to and fro about said first shaft in an arcuate path beneath said first shaft to effect reciprocable movement of the wiper in a generally horizontal path across the windshield through first and second strokes; a first planetary drive means operatively connected with said first and second shafts and operable during running operation of the wiper to effect rotation of said wiper relative to said lever means in response to said lever means being swung to and fro to increase the length of the strokes of the wiper blade assemblies; a second planetary drive means operatively connected with said first shaft and said articulating arm means for actuating said articulating arm means to pivot said wiper blade assembly relative to said wiper arm to maintain said wiper blade assembly in a substantially vertical disposition as it is moved through its stroke in response to swinging movement being imparted to said lever means; and a parking mechanism operable to permit said wiper arm and said articulating means to move relative to said lever means during running operation and operable in response to running operation being terminated to prevent said wiper and articulating means from moving relative to said lever means upon said wiper reaching a predetermined position during one of its strokes whereby said wiper is caused to be moved toward a horizontal position adjacent the lower edge of the windshield during the remaining portion of said one stroke.

3. A windshield wiping apparatus for wiping a windshield of an automotive vehicle comprising: a stationary support means which is adapted to be secured to the vehicle; a first shaft supported by said support means; a lever means having one end pivotally connected with said first shaft; a second shaft pivotally connected with the other end of said lever means; a windshield wiper comprising a wiper arm drivingly connected with said second shaft, a wiper blade assembly pivotally connected with said wiper arm for movement about an axis extending generally normal to the windshield and an articulating arm means operatively connected with said wiper blade assembly and pivotally connected with said second shaft; a primary drive means operatively connected with said lever means adjacent its other end for swinging the same to and fro about said first shaft through an arc of approximately 180° to effect reciprocation of said wiper in a generally horizontal path across the windshield through first and second strokes; a first planetary drive means operatively connected with said first and second shafts and operable to effect rotation of said second shaft and wiper relative to said lever means through an arc of substantially 90° in response to said lever means being reciprocated to and fro by said primary drive means to increase the length of the strokes of the wiper blade assembly; a second planetary drive means operatively connected with said first shaft and said articulating arm means for actuating said articulating arm means to pivot said wiper blade assembly relative to said wiper arm in response to said lever means being swung to and fro to maintain said wiper blade assembly in a substantially vertical disposition as the wiper is moved through its strokes; and a parking mechanism operable to automatically park the wiper in a generally horizontal park position adjacent the lower edge of the windshield when wiper operation is being terminated, said parking mechanism comprising a cam secured to said lever means and having an arcuate cam surface substantially concentric with said first shaft, said cam having a notch intermediate its ends; a parking arm drivingly connected with said first shaft and having a bifurcated end defining a notch; said stationary housing means having a notch; a movable detent means movable between a first position in which a detent thereof is disposed within said notches of said parking arm and stationary housing means to lock said parking arm to said stationary support means to allow said lever means to rotate relative to the parking arm and a second position in which the detent thereof is removed from said notch of said housing means and is disposed within said notches of said parking arm and said cam of said lever means to lock said parking arm to said lever means to effect simultaneous rotation of said parking arm and lever means as well as rotation of said planetary drive means to effect movement of said windshield wiper toward a horizontal park position adjacent the lower edge of the windshield, said detent means being in its first position during running operation and being movable toward its second position when running operation is being terminated, said detent means being received in said notch of said cam when said wiper is vertically disposed and is located midway between the stroke ends of its second stroke, said parking arm when locked to said lever means causing said planetary drive to rotate while also being swung by said lever means to maintain the relative positions of the wiper and the lever means intact to enable the wiper to be moved from a generally vertical position toward a generally horizontal park position.

* * * * *